L. POETON.
TEMPLE FOR OPHTHALMIC MOUNTINGS.
APPLICATION FILED NOV. 24, 1917.
1,265,377.
Patented May 7, 1918.
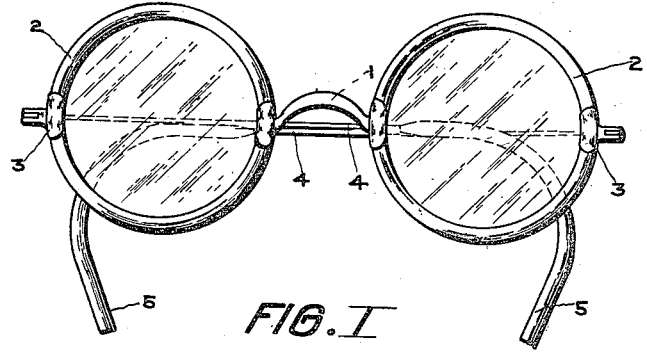
FIG. I
FIG. II
FIG. III
FIG. IV
FIG. V
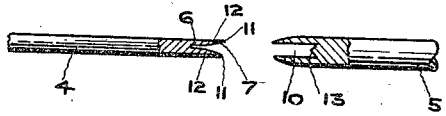
FIG. VI    FIG. VII
FIG. VIII
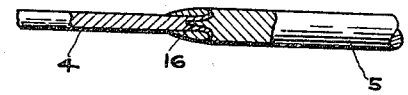
FIG. IX
FIG. X
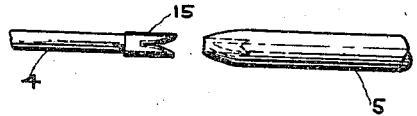
FIG. XI
INVENTOR
LAURENCE POETON
BY
*H. H. Styll A. K. Parsons*
ATTORNEYS

UNITED STATES PATENT OFFICE.

LAURENCE POETON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

TEMPLE FOR OPHTHALMIC MOUNTINGS.

1,265,377.  Specification of Letters Patent.  Patented May 7, 1918.

Application filed November 24, 1917. Serial No. 203,776.

*To all whom it may concern:*

Be it known that I, LAURENCE POETON, a citizen of the United States, residing at Southbridge, in the county of Worcester and State of Massachusetts, have invented certain new and useful Improvements in Temples for Ophthalmic Mountings, of which the following is a specification.

My invention relates to improvements in ophthalmic mountings, and has particular reference to the temple or ear engaging portion of such mountings.

The leading object of the present invention is the provision of a novel and improved construction of ear engaging member or temple of what is commonly known as the combination type, that is, one composed in part of a metallic and in part of a non-metallic material.

A further object of the invention is the provision of a novel form of joint and method or process of forming said joint whereby the parts may be readily connected to each other and when so joined will securely hold against either twisting or direct pull tending to separate them.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of a mounting embodying my improvements.

Fig. II represents a view in elevation of one of my improved temples with a clear ear hook, whereby the details of the joint may be seen through the transparent material of the hook.

Fig. III represents a detailed view of the butt section.

Fig. IV represents a sectional view of the portion of the ear hook adjacent the joint adapted to receive the end of the butt.

Fig. V represents a plan view of the mill or cutter for forming the end of the butt.

Fig. VI represents a fragmentary view of a slightly modified butt section.

Fig. VII represents a fragmentary sectional view of the ear hook portion adapted to receive the butt portion shown in Fig. VI.

Fig. VIII represents a sectional view of the joint in partially formed condition.

Fig. IX represents a similar view of the completed joint.

Fig. X represents a sectional view of a joint section provided with a separate spreading wedge, and Fig. XI illustrates a further improvement.

In the drawings, in which similar characters of reference are employed to denote corresponding parts throughout the several views, the numeral 1 designates the bridge of an ophthalmic mounting having attached to its ends the frames 2 provided with the end pieces 3 to which are pivoted the temple butts 4 preferably of metal and having attached thereto in my improved manner and by my improved joint the non-metallic ear hook portions 5.

While various methods may be employed to effect the joining of the ear hook and butt portions of a temple of this character, there are certain problems to be reckoned with in the formation of the connection, as it must be neat and inconspicuous in appearance, must securely hold the parts against either twisting or longitudinal shifting, and the parts should preferably so interlock that any expansion or stretching of the non-metallic part will not impair the durability and holding powers of the joint.

To accomplish these results, in the form of my invention particularly illustrated in Figs. II, III, and IV, I have shown the end of the temple butt split or kerfed as at 6 and having the terminal or outer portion of the kerf milled out as at 7 to provide outwardly flaring walls with a short parallel portion at their bases, this shape or kerf being formed as by the cutter illustrated in Fig. V having the circular saw portion 8 and the mill 9 so that as the tool engages the butt it will first form a kerf in it and then mill out or bevel off the corners at the sides of the kerf. The butt having been thus prepared, the ear hook section is formed to receive the butt as shown in Fig. IV by drilling to form the socket 10 which I preferably form of size to just receive the end of the butt, although it will be understood that the socket may either be smaller than the wire, of size to make a tight fit with it or even slightly larger than the diameter of the wire without to any appreciable degree affecting the permanence and holding qualities of my joint.

In any event, the parts having been prepared substantially as shown in Figs. III and IV the parts are forced together when the butt will slide into the socket 10 till it strikes the bottom of the socket, when upon continued pressure the fact that the points 11 are interiorly rounded and strike first at the outer sides of the socket will cause the intermediate portion of the socket to act as a wedge opening out the prongs and their inner curves causing them to bend back on themselves as they are pressed into the ear hook and to assume substantially the form shown in Fig. II.

In Figs. VI to IX inclusive I have illustrated a slightly modified form of my invention in which the bottom of the socket in place of being flat is formed with the central projecting cone to engage between the prongs 12 to aid in forcing them apart and which will at the same time more readily fill up the space within the parallel portion of the walls of the kerf as at 6. Also in connection with this form of my invention I have shown the prongs as forced outward through the sides of the ear hook in place of being contained entirely within the hook and as being suitably clenched or swaged down into the outer face of the hook to most securely interlock therewith to prevent loosening and at the same time leave no projecting irregularities or the like.

In Fig. X, I have shown a slight modification of Fig. VII in that in place of forming the cone or wedge 13 at the time of original drilling of the ear hook I make use of the supplemental wedge member 14 which may be loosely dropped into the bore of the ear hook and will facilitate the spreading of the prongs and will also aid in filling up the unbent portion of the kerf.

I have previously mentioned the desirability of having the manner of connection of the parts as inconspicuous as possible, due to the conspicuous position of the joint when my improved temple is in use, and to render the fitting of the metal within the xylonite or other non-metallic material relatively unnoticeable I have found it desirable to form on the kerfed portion of the butt section the coating of suitable lacquer or the like 15 of the same color as that of the ear hook into which it will fit, as silver color for pearl gray or reddish brown for ordinary dark xylonite or shell, the result being that when the end of the butt so treated is placed within the socket of the ear hook it will be entirely invisible to the ordinary observer, although of course detectable if the parts are held up to the light.

From the foregoing description taken in connection with the accompanying drawings the construction and advantages of my improved temple for ophthalmic mountings should be readily apparent and it will be seen that by the use of my improved joint the parts are firmly held as by the reversely bent prongs or barbs against separation by longitudinal pull, while the interlocking of the barbs with the ear hook eliminates the possibility of relative twisting of the parts. In this connection I would invite particular attention to the fact that while the parts may be joined either cold or with the ear hook softened either by exterior heating or by having the entering portion of the butt heated to by conduction soften the hook adjacent the socket, in either case the main advantage of the heating is that the material of the hook will more readily fill up the end of the kerf. This filling up of the kerf forms a locking wedge or key between the two prongs of the butt in that it is necessary to compress the straight portion of the key 16 to allow the prongs to straighten out as is necessary if they are to back out as they were forced in, and as the material of the ear hook is relatively incompressible the prongs are therefore locked in place by the key.

I claim:—

1. A device of the character described, including a kerfed butt member and an ear hook having a socket to receive the butt, the kerf being flared in the direction of the socket, whereby forcing of the butt against the socket will expand the kerf to lock the parts together, substantially as described.

2. In a temple for an ophthalmic mounting, the combination with a non-metallic ear hook member, of a butt section having prongs, and interengaging parts on the butt and ear hook for spreading the prongs within the ear hook to lock the parts together.

3. In a temple, the combination with a butt section having a kerf formed in the free end thereof, said kerf having the inner portion formed with substantially parallel walls and the outer portion flaring, of an ear hook section of softer material, said section having a socket to receive the kerfed end of the butt and the butt being forced into the ear hook beyond the socket, whereby the engagement of the flared portion of the kerf with the hook will expand the ends of the butt to lock the parts together and the engagement of the hook in the inner portion of the slot or kerf will form a key to prevent disengagement of the parts, substantially as described.

4. In a temple, the combination with a non-metallic ear hook, of a metallic butt section having prongs inserted in and expanded while within the ear hook to secure the parts together.

5. In a temple, the combination with a semi-transparent or translucent ear hook, of a butt having its end anchored in the ear hook, the embedded portion of the butt being colored to correspond with the ear hook to render it substantially invisible.

6. The process of forming a temple consisting in forming an ear hook section with a socket, forming a butt with a kerf having parallel inner walls and flaring outer wall portions, inserting the kerfed portion in the socket, softening the ear hook and forcing the parts together while hot, whereby the engagement between the flared outer portions of the kerfed butt and the ear hook will reversely bend said outer wall portions while the ear hook will fill in the space between the parallel walls of the kerf and form a keystone to prevent withdrawal of the prongs when the ear hook has cooled and hardened.

7. The combination with a non-metallic fitting, of a metallic part having self expanding prongs forced into the fitting, substantially as illustrated.

8. In an ophthalmic mounting, the combination with a non-metallic part, of a metallic part adapted to be secured thereto and including a pair of spaced automatically expanding prongs, and means in the non-metallic part for engagement with the prongs to assist in the expansion and locking thereof.

In testimony whereof I have affixed my signature, in presence of two witnesses.

LAURENCE POETON.

Witnesses:
HARRY H. STYLL,
H. K. PARSONS.

Copies of this patent may be obtained for five cents each, by addressing the "Commissioner of Patents, Washington, D. C."